United States Patent
Gronau et al.

(10) Patent No.: US 7,620,485 B2
(45) Date of Patent: Nov. 17, 2009

(54) METHOD FOR REGULATING DRIVING STABILITY

(75) Inventors: Ralph Gronau, Wetter (DE); Torsten Herrmann, Frankfurt/M (DE); Artur Kost, Bad Soden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 586 days.

(21) Appl. No.: 10/504,587

(22) PCT Filed: Feb. 5, 2003

(86) PCT No.: PCT/EP03/01123

§ 371 (c)(1),
(2), (4) Date: Jan. 18, 2005

(87) PCT Pub. No.: WO03/068581

PCT Pub. Date: Aug. 21, 2003

(65) Prior Publication Data

US 2005/0121975 A1    Jun. 9, 2005

(30) Foreign Application Priority Data

Feb. 14, 2002 (DE) ............................. 102 06 342
Dec. 10, 2002 (DE) ............................. 102 57 509
Jan. 27, 2003 (DE) ............................. 103 03 154

(51) Int. Cl.
*A01B 69/00* (2006.01)
*B62D 6/00* (2006.01)

(52) U.S. Cl. ............................ 701/41; 701/43; 180/410; 180/446

(58) Field of Classification Search .................. 701/41, 701/43; 180/410, 446
See application file for complete search history.

(56) References Cited

U.S. PATENT DOCUMENTS 5,373,911 A * 12/1994 Yasui ......................... 180/168
6,895,318 B1 * 5/2005 Barton et al. ................. 701/42

FOREIGN PATENT DOCUMENTS

CA    2 304 545 A1    10/2001

(Continued)

OTHER PUBLICATIONS

International Search Report of Application No. PCT/EP03/01123 dated May 20, 2003.

(Continued)

*Primary Examiner*—Khoi Tran
*Assistant Examiner*—Brian J Broadhead
(74) *Attorney, Agent, or Firm*—RatnerPrestia

(57) ABSTRACT

The invention relates to a method for controlling the driving stability of a vehicle, wherein it is determined when a stable or unstable driving behavior prevails whether a tendency to a subsequent unstable driving behavior exists as a result of a highly dynamic inward swerve.

In order to provide a method for controlling driving stability, which allows a reaction to predicted unstable driving situations by means of an intervention diminishing or avoiding critical driving situations, the steering force and/or the steering angle of a steering handle is corrected in this case in such a manner that when the steering handle is operated, the driver is assisted in the direction of an understeering vehicle course.

8 Claims, 1 Drawing Sheet

FOREIGN PATENT DOCUMENTS

| | | |
|---|---|---|
| DE | 44 28 351 A1 | 2/1995 |
| DE | 44 10 361 A1 | 9/1995 |
| DE | 196 32 943 A1 | 2/1998 |
| DE | 198 42 439 A1 | 3/1999 |
| EP | 1 046 571 A2 | 10/2000 |
| WO | WO 02/36401 A1 | 5/2002 |

OTHER PUBLICATIONS

German Search Report of Application No. DE 103 03 154.5 dated Jan. 16, 2004.

* cited by examiner

METHOD FOR REGULATING DRIVING STABILITY

The present invention relates to a method for controlling the driving stability of a vehicle.

Abrupt steering and countersteering actions during e.g. obstacle avoidance maneuvers, lane changes and similar maneuvers can cause instabilities of the vehicle at high coefficients of friction. There is an increased risk of rollover in vehicles with a high center of gravity.

A great number of driving stability control systems for automatically counteracting these vehicle instabilities have become known in the art. The term 'driving stability control' covers five principles of influencing the driving behavior of a vehicle by means of predefinable pressures or brake forces in or at individual wheel brakes and by means of intervention into the engine management of the driving engine. These systems concern brake slip control (ABS) intended to prevent the locking of individual wheels during a braking operation, traction slip control (TCS) preventing the spinning of the driven wheels, electronic brake force distribution (EBD) regulating the ratio of the brake forces between front and rear axles of the vehicle, anti-rollover braking (ARB) preventing rollover of the vehicle about its longitudinal axis, and yaw torque control (ESP) safeguarding stable driving conditions during yawing of the vehicle about its vertical axis.

Hence, the term 'vehicle' in this context refers to a motor vehicle with four wheels equipped with a hydraulic, electrohydraulic, or electromechanical brake system. In the hydraulic brake system, the driver can develop brake pressure by means of a pedal-operated master cylinder, while the electrohydraulic and electromechanical brake systems build up brake force depending on the detected braking request of the driver. Reference is made to a hydraulic brake system in the following. Each wheel comprises a brake having one inlet valve and one outlet valve associated therewith. The wheel brakes are connected to the master cylinder by way of the inlet valves, while the outlet valves lead to a non-pressurized reservoir or low-pressure accumulator. There is still provision of an auxiliary pressure source that is able to build up pressure in the wheel brakes also irrespective of the position of the brake pedal. The inlet and outlet valves are electromagnetically operable for pressure control in the wheel brakes.

To detect conditions related to driving dynamics, there is provision of four rotational speed sensors, one per wheel, a yaw rate sensor, a lateral acceleration sensor, and at least one pressure sensor for the brake pressure generated by the brake pedal. Instead of the pressure sensor, a pedal travel sensor or pedal force sensor may also be used if the auxiliary pressure source is arranged in such a way that it is impossible to distinguish the brake pressure built up by the driver from the pressure of the auxiliary pressure source.

In driving stability control, the driving behavior of a vehicle is influenced in such a manner that the driver can master it better in critical situations. A critical situation herein implies an unstable driving condition in which the vehicle does not follow the specifications of the driver in the extreme case. Thus, in situations of this type, the function of driving stability control consists in imparting to the vehicle the vehicle performance desired by the driver within the physical limits.

While the longitudinal slip of the tires on the roadway is in first line significant for brake slip control, traction slip control, and electronic brake force distribution, further quantities such as the yaw rate and the sideslip angle gradient are included for consideration in yaw torque control (YTC). Anti rollover systems typically evaluate lateral acceleration quantities or roll rates (DE 196 32 943 A1).

It would be desirable to generally avoid unstable driving situations, which the driver frequently cannot master, so that critical driving situations cannot occur at all.

WO 02/36401 A1 discloses a method for predicting the behavior of a motor vehicle, which in dependence on the time variation of the steering angle velocity determines during a stable driving behavior whether there is a tendency to a subsequent unstable driving behavior. In the affirmative, braking pre-intervention will be executed already during the stable driving behavior. Further, a method is described which takes place in an extreme countersteering maneuver during cornering at a high lateral acceleration and wherein the lateral acceleration is also taken into account apart from the time variation of the steering angle velocity. Roll motions (rebound and compress) are produced by the high lateral dynamics of the vehicle body in extreme countersteering maneuvers during cornering at a high lateral acceleration. The vehicle becomes unstable, involving the risk of rollover about its longitudinal axis.

Driving maneuvers of alternating dynamics such as a lane change represent a special challenge in terms of driving dynamics because various forces must be accommodated (inertia force of the sliding vehicle, centrifugal force of the vehicle on a circular path), on the one hand, and because the wheel conditions (coefficient of friction between tires and roadway, braking operation, reaction time of the driver) based on which the driving maneuver can take place are variable in time, on the other hand. The unstable driving behavior of the vehicle during driving maneuvers of alternating dynamics can be triggered or supported by quick steering movements performed by the driver as a reaction to an expected or an actual unstable driving behavior. Therefore, it would be desirable to provide the driver with all possible aids being of assistance in critical driving situations.

An object of the invention is to disclose a method for controlling the driving stability, which allows a reaction to predicted unstable driving situations by means of an intervention that diminishes or avoids critical driving situations.

According to the invention, this object is achieved in that in this case the steering force and/or the steering angle of a steering handle is corrected in such a manner that when the steering handle is operated, the driver is assisted in the direction of an understeering vehicle course.

The unstable driving situation can be predicted based on a stable or unstable driving situation. The method makes use of the correction of the steering force and/or the steering angle of a vehicle with a steering handle such as a steering wheel, and the turning of said wheel produced by the vehicle operator is converted by a steering mechanism into a tilting movement of the steerable wheels of the vehicle. As this occurs, a control is performed in which the steering angle produced by the driver is monitored to check whether the steering movement of the steering handle causes an unstable driving behavior. If an unstable driving behavior is produced by the steering movement or can develop therefrom, the change or modification of the steering force will induce the driver to steer properly. The extent of the servo assistance can be reduced when the driver performs steering movements that lead to an unstable driving situation or augment an unstable driving situation when the vehicle is equipped with a servo steering system. In a vehicle which is equipped with an auxiliary-power or servo steering system, e.g. an electrically operable steering system, the steering force can be changed on command of electric actuating signals in such a way that the magnitude of the auxiliary force is increased or reduced, for example. Also, the steering angle can be changed in addition to prevent an unstable driving situation.

Figure 1:
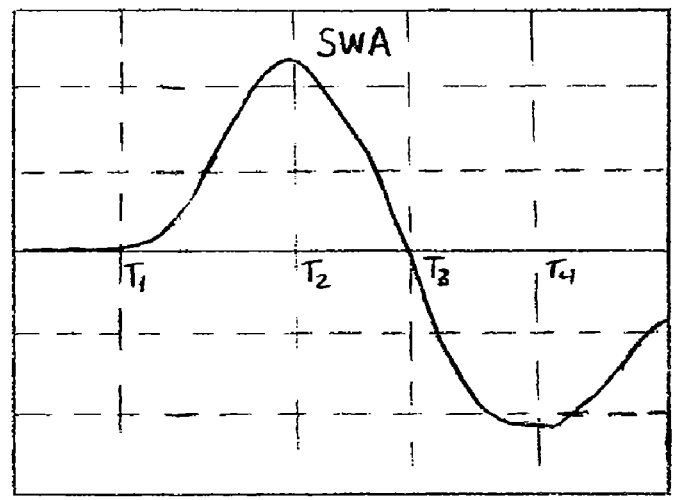
FIG. 1 is an illustrative graph showing a steering wheel angle versus time.

It is favorable that a pattern (See FIG. 1) is determined in the initial phase of steering or during an inward swerve, respectively, by way of the amplitude and the frequency and, as the case may be, a zero passage of the steering angle (SWA) with a substantially undiminished steering angle velocity, said pattern being used to predict an unstable driving behavior.

When an imminent unstable driving behavior or an expected condition is predicted on the basis of the current driving condition, the steering force and/or the steering angle of the steering handle is modified, e.g. raised or lowered and/or increased or decreased by means of a control anticipating the predicted condition.

Figure 2:
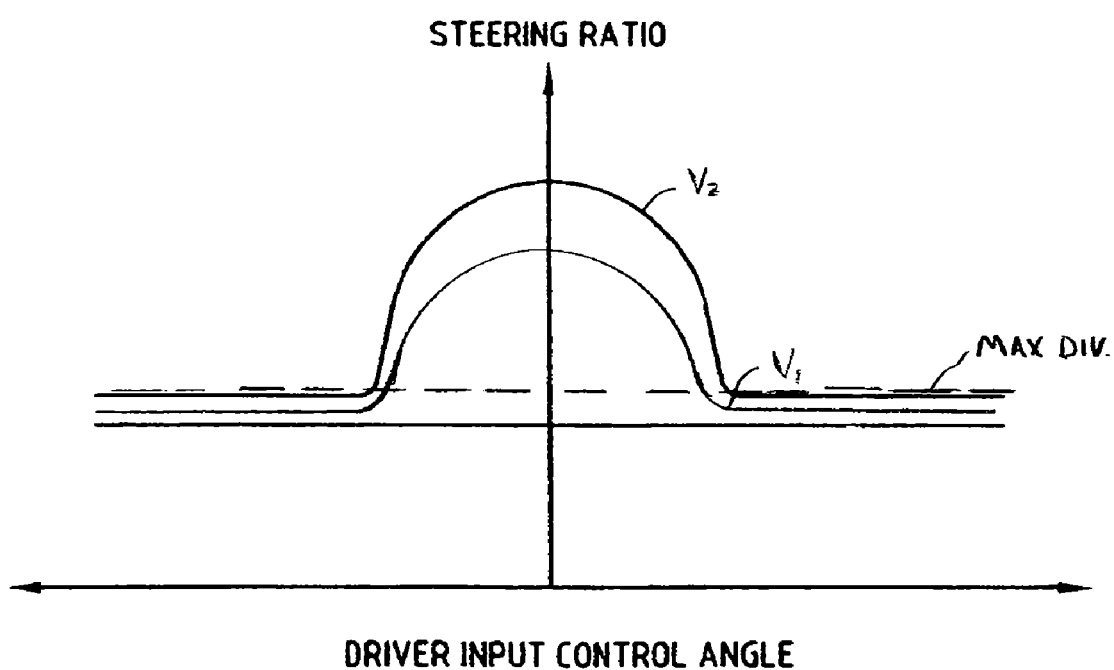
FIG. 2 is an illustrative performance graph of a steering power assistance.

It is advantageous that the steering force and/or the steering angle is modified in dependence on a performance graph of a steering power assistance (steering ratio) (See FIG. 2) taking the speed ($V_1$, $V_2$) of the vehicle into account.

It is favorably arranged that the performance graph is adjusted in the direction of a speed higher than the actual speed of the vehicle.

Further, it can be expedient that the modification of the steering force and/or the steering angle is adjusted in dependence on the period of time until the unstable driving behavior sets in.

In addition, it can be suitable that the modification of the steering force and/or the steering angle is adjusted in dependence on a characteristic curve.

To determine driving situations, it is favorable that the magnitude of the steering force and/or the steering angle is adjusted in dependence on a track model. Advantageously, a maximum track divergence from the vehicle track desired by the driver is predefined in the track model, the desired track is compared to the maximum track divergence, and when the track divergence falls below the maximum value thereof, the magnitude of the steering force and/or the steering angle is reduced to such effect that the correction of the steering force or the steering angle is withdrawn.

Vehicles can quickly tilt about their longitudinal axis in driving maneuvers of alternating dynamics. These rollover-critical situations in driving maneuvers of alternating dynamics can be caused by correspondingly quick steering movements, which the driver performs in driving situations that generally necessitate a quick reaction to the driving behavior of the vehicle. To reduce the roll excitation or roll frequency of the vehicle developing as a result thereof and causing rollover, a pattern detection of the rollover-critical steering angle signal or steering angle speed signal is provided.

When a critical pattern in terms of frequency and amplitude is detected in a lane change during the first inward swerve and, in addition, a zero passage of the steering angle with a correspondingly undiminished steering angle speed is possibly determined, and when this pattern leads to conclude a continuation of the maneuver, the characteristics of steering (steering force and/or steering angle) is changed. This change is preferred in the direction of heavy steering because an increase of the steering angle (due to softer steering; higher steering assistance) in this situation does not have such a great influence on the driving situation because the vehicle is already at the driving-dynamics limit.

The steering characteristics can be influenced by a change-over of the speed performance graph (a speed $V_2$ is assumed that is higher than the speed $V_1$ at which the vehicle is actually riding). This change-over can be set depending on how near the critical situation is, or it can be approached following a characteristic curve. The extent of the change can be predefined according to a track model by way of a maximum track divergence from the track actually chosen by the driver, at which track divergence the influencing action is reduced again, as the case may be. This influencing action can be used both in servo steering systems (parameter steering operations) and in steer-by-wire systems.

The invention claimed is:

1. Method for controlling the driving stability of a vehicle comprising:
   determining during a stable or unstable driving behavior whether a tendency to a subsequent unstable driving behavior exists as a result of a highly dynamic inward swerve,
   correcting the steering force, the steering angle of a steering handle, or a combination thereof in such a manner that when the steering handle is operated, the driver is assisted in the direction of an understeering vehicle course, wherein the steering force, the steering angle or combination thereof is corrected in dependence on a performance graph of a steering power assistance taking the speed of the vehicle into account and the performance graph is adjusted in the direction of a speed higher than the actual speed of the vehicle.

2. Method as claimed in claim 1, further comprising:
   determining a pattern in the initial phase of steering or during an inward swerve, respectively, by way of the amplitude and the frequency and, as the case may be, a zero passage of the steering angle with a substantially unreduced steering angle velocity, said pattern being used to predict an unstable driving behavior.

3. Method as claimed in claim 1,
   wherein the steering force of the steering handle, the steering angle, or a combination thereof is increased or decreased.

4. Method as claimed in claim 1,
   wherein the modification of the steering force, the steering angle or a combination thereof is adjusted in dependence on a characteristic curve.

5. Method as claimed in claim 1,
   wherein the magnitude of the steering force, the steering angle or a combination thereof is adjusted in dependence on a track model.

6. Method as claimed in claim 5,
   wherein a maximum track divergence from a track desired by the driver is predefined in the track model, in that the track desired is compared to the maximum track divergence, and in that when the track divergence falls below the maximum value thereof, the magnitude of the steering force, the steering angle or a combination thereof is reduced to such effect that the modification of the steering force, the steering angle or a combination thereof is withdrawn.

7. The method of claim 1 wherein the vehicle includes an electrically operable steering system.

8. The method of claim 1 wherein the vehicle includes a servo steering system.

* * * * *